UNITED STATES PATENT OFFICE.

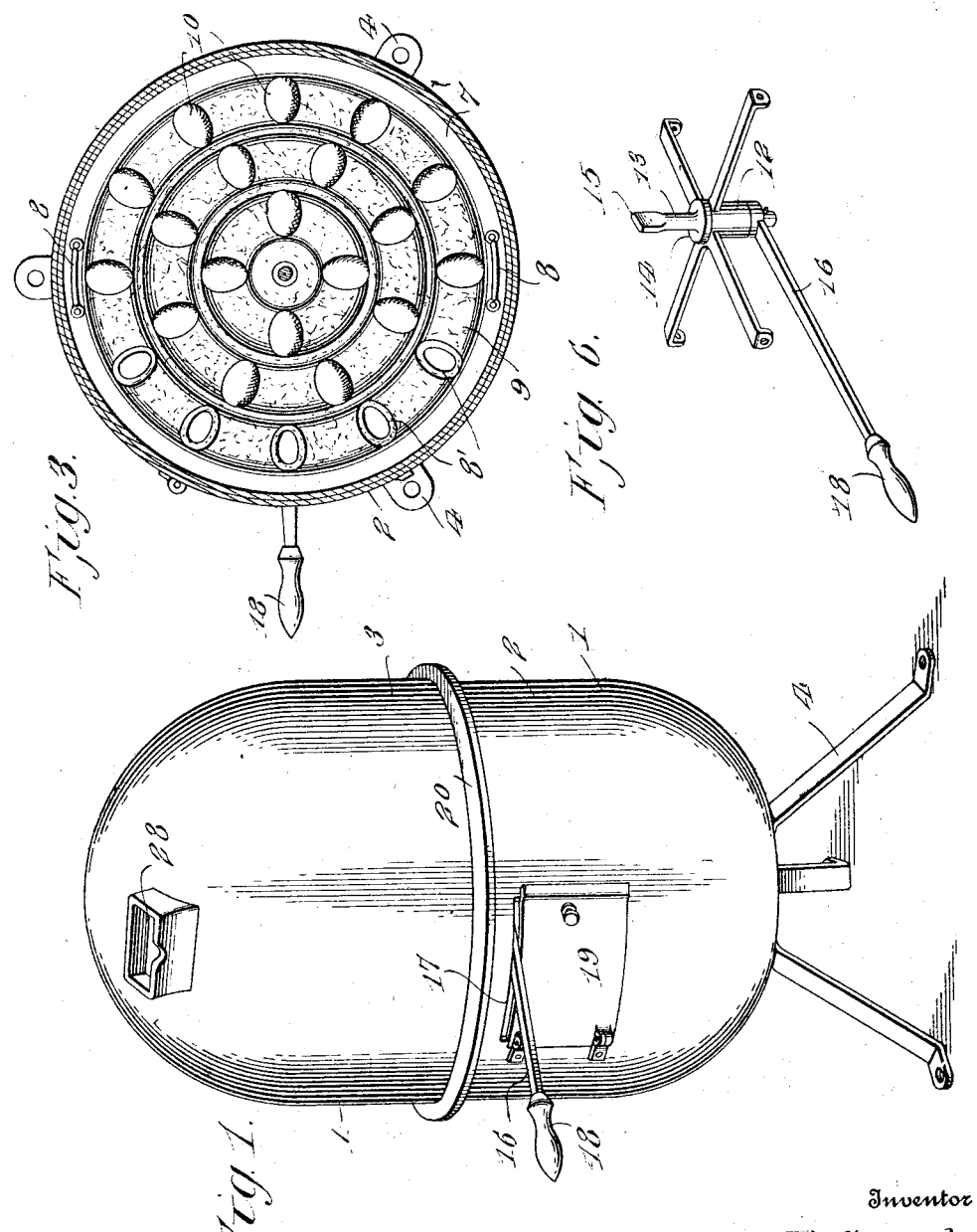

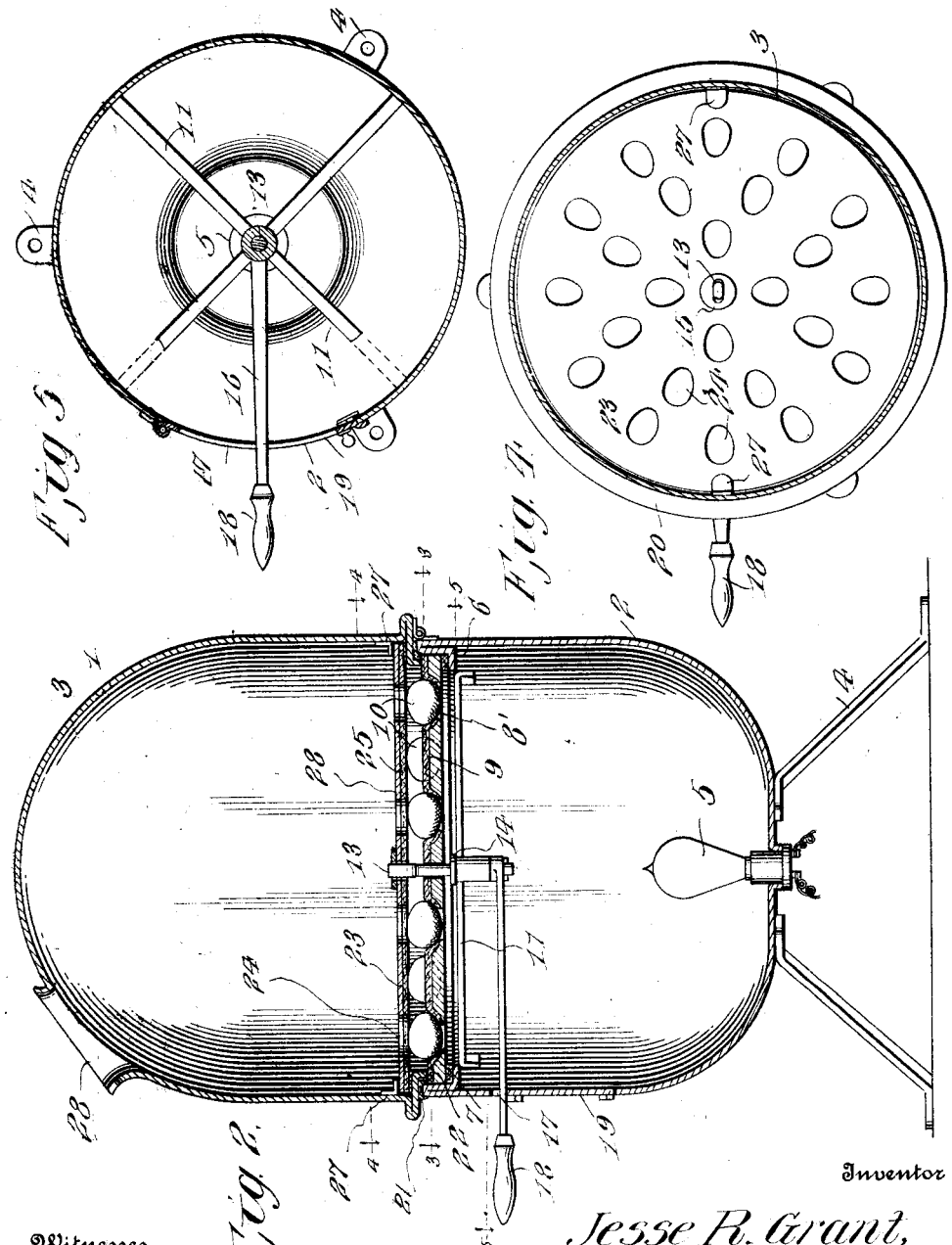

JESSE R. GRANT, OF KOKOMO, INDIANA.

EGG-TESTER.

1,055,900.  Specification of Letters Patent.  Patented Mar. 11, 1913.

Application filed August 6, 1912. Serial No. 713,599.

*To all whom it may concern:*

Be it known that I, JESSE R. GRANT, a citizen of the United States, residing at Kokomo, in the county of Howard and State of Indiana, have invented new and useful Improvements in Egg-Testers, of which the following is a specification.

The present invention relates to improvements in egg testers.

In carrying out my invention, I propose to provide a simple, cheap and effective device of this character comprising a receptacle which is divided by an egg receiving partition into a light chamber arranged to the bottom of the partition and a dark chamber disposed above the top of the partition, the dark chamber having an eye piece which is so arranged that the face of the operator will fit against the edges thereof to shut out the light, thereby permitting the light from the light chamber to be concentrated upon the eggs which are arranged within depressions or openings provided by the partition so that the entire contents of the shells will be apparent and the condition of the eggs readily ascertained.

I also aim to construct a device wherein the lower wall of the light chamber shall be rounded and provided with a suitable reflector whereby the rays of the light will be diffused through all of the eggs which are arranged upon a partition above the light chamber.

It is also my purpose to provide means whereby the eggs may be moved from one of their sides to their opposite sides so that both sides of the shells of the eggs as well as the contents of the eggs will be brought to the view of the operator.

It is a further object of the invention to provide an egg tester comprising a stationary lower member embodying a light chamber having cleats for the support of an egg tray or partition, and an upper dark chamber hingedly connected therewith, the said upper chamber being provided with a sight opening, and also with means for supporting an egg turning element, a handle having an upturned finger or shaft being arranged to project through the lower partition, and the shaft of the said handle so engaging with the turning member as to permit of the dark chamber being swung to an open position without interfering with the arrangement of the turning member upon the light chamber.

With the above recited objects in view, and others which will appear as the nature of the invention is more fully understood, that improvement resides in the construction, combination and operative arrangement of parts set forth in the following description, and falling within the scope of the appended claims.

In the drawings, Figure 1 is a perspective view of an improved egg tester constructed in accordance with this invention. Fig. 2 is a central longitudinal sectional view through the same. Fig. 3 is a horizontal sectional view upon the line 3—3 of Fig. 2. Fig. 4 is a similar sectional view upon the line 4—4 of Fig. 2. Fig. 5 is a similar section upon the line 5—5 of Fig. 2. Fig. 6 a perspective view of the turning handle and its spider support.

As is well known among merchants, great difficulty is experienced in ascertaining the condition of eggs which are handled in the process of business. This is especially true in wholesale houses where a great quantity of eggs is purchased or sold at a single deal. In order to candle each egg separately quite an amount of valuable time will be lost, and as a consequence the profit will be materially depreciated. Such well known defects are or deteriorations in eggs commonly known as "black-rots" readily perceptible in the ordinary process of candling, and in fact such defects are also perceptible when an egg is held between the fingers of the operator and between his gaze and the light, but such a process would not aid the operator in ascertaining such deteriorations as "badly heated" eggs, "held" eggs, "red-rots," etc. Neither would such a process permit of the operator ascertaining the air space between the egg and its shell, which is of material importance in determining the condition of the egg. I have also found from experience, that in order to properly ascertain the condition of the eggs, the said eggs must be observed from different angles and further that it is desirable to revolve the eggs to slightly stir the same in order that all defects may be observed and the condition of the egg thus ascertained.

Referring to my improved egg tester in detail, with reference to the accompanying drawings, the numeral 1 upon the said drawings, designates the improvement in its entirety. The egg tester contemplates the employment of a receptacle which embodies a lower member 2 and a top member 3 which is hingedly connected with the lower member. Both of these members are preferably round in cross section, and both of the said members have rounded ends. The receptacle 2 is provided with legs 4 whereby the same may be sustained upon a suitable support. The lower receptacle 2 comprises what I term the light chamber for the device, and the inner wall thereof is preferably provided with a glazed surface which serves as a reflector for the light from a suitable lamp, which in the present instance comprises an incandescent electric bulb 5, which is preferably arranged centrally within the rounded bottom portions of the light chamber 2. The bulb is so arranged with relation to the chamber as to prevent any entrance of the outer light to within the chamber. The open upper edge of the dark chamber is preferably bent inwardly and then bent again inwardly to provide an annular flange 6, the said flange being adapted as a support for a partition which also serves as an egg tray 7. The tray 7 is provided with suitable hand holds 8 whereby the tray may be removed from the light compartment 2 when desired. The tray is formed with a plurality of radially spaced elliptical openings 8', and the upper face of the tray is concaved to provide the side walls formed by the said openings. The upper face of the tray as well as the walls of the openings has a coating of soft material 9, whereby the eggs 10 which are arranged upon the walls of the openings are nested upon a cushion which obviates all danger of the breakage of the eggs. Disposed below the tray 7 and connected with the light chamber 2 is the spider 11, the central portion of which has a depending sleeve which serves as a bearing for a shaft 13. This shaft is provided with a collar 14 which rests upon the upper face of the sleeve of the spider, and the upwardly extending portion of the said shaft 13 is of a pointed or angular formation as designated by the numeral 15. It will thus be noted that the spider provides means, (the sleeve) whereby the shaft is properly sustained in a vertical position as well as a support for the shaft and a lever which is connected with the shaft, as will presently be set forth. Connected with the lower portion of the shaft which extends below the sleeve 12 is a lever 16, the same extending through an opening 17 formed in the light chamber 2, and the extremity of the lever is provided with a handle 18. The opening 17 is preferably of a rectangular formation and has all but its upper portion closed through the medium of a hinged door 19, the door being provided so that access may be obtained to the lamp 5 without necessitating the removal of the tray, or whereby the flame of the lamp may be regulated when a lamp other than an incandescent bulb is employed as a light source.

The upper or dark chamber 3 has its open edge flanged as at 20, and rests upon a compressible washer 21 which is arranged upon the open end of the light compartment 2, whereby all light is excluded from the said dark chamber. The flange 20 is inturned to provide a ledge 22, the said ledge receiving a flat egg turning member 23. The member 23 is provided with openings 24, the same being in number equal to the number of openings in the tray or partition 7, and the said openings are adapted to be arranged directly above the said openings in the tray. The under face of the member 23 is provided with a lining 25 of soft material. By reference to Fig. 2 of the drawings it will be noted that eggs 10 are arranged within the openings or pockets of the tray, and are also engaged by the walls of the openings or pockets of the turning members, the purpose of which will presently be set forth. The turning member 23 is centrally formed with a non-circular opening of a size sufficiently large to snugly receive the pointed or non-circular end 15 of the shaft 13, whereby the turning member may be oscillated by the movement of the lever 16 of the said shaft. When the eggs are arranged upon the tray 7, the lever 16 is central of the opening 17, and, it being understood that the shaft 13 extends through a central opening in the tray or partition 7, a movement of the lever in either direction will cause the eggs to be rotated upon the tray from one of their pockets to the adjacent pocket upon either side of the pocket occupied by the egg. The space provided by the openings 17 is sufficient to permit of this movement, and the vertical walls or edges of the said openings serve as stops for limiting the movement of the lever in either direction.

The dark chamber 3 is provided with a coating of dark material. The dark chamber is further provided with cleats 27 which bear upon the upper face of the turner member 23, to sustain the same upon the ledge 22, and the said dark chamber adjacent its rounded top is formed with an opening provided with a projecting eye piece 28. This eye piece is so constructed and arranged as to snugly fit against the features of the operator to shut out the light from the dark compartment as well as to direct the line of vision downwardly toward the eggs.

It will be noted by reference to Fig. 2 of the drawings that the upper and lower compartments are connected through the medium of a hinge, so that the upper compartment may be swung to an open position with relation to the lower compartment.

Having thus described the invention, what I claim is:—

1. An egg tester comprising a receptacle having upper and lower rounded walls, a removable reticulated egg supporting partition for the receptacle dividing the same into a light compartment and a dark compartment, a reflector within the light compartment, a lamp for the light compartment, an eye piece for the upper dark compartment, and means for rolling the eggs upon the reticulated partition, substantially as and for the purpose set forth.

2. An egg receptacle comprising a cylindrical member having a rounded top and a rounded bottom, a partition provided with openings forming egg receiving pockets within the receptacle, an egg turning member arranged above the receptacle, said turner being also provided with openings providing egg engaging pockets, means for operating the turner member to roll the eggs from one of their pockets to the adjacent pocket, and a light within the receptacle and below the partition, the receptacle being provided with a sight opening having an eye piece arranged above the turner member.

3. In an egg tester, a cylindrical receptacle having rounded ends, said receptacle comprising a pair of hinged compartments, one of the compartments having a reflective surface and being provided with a light, the second compartment being provided with a coating of dark material, a removable egg tray within the light compartment, a spider within the light compartment, a shaft rotatably mounted upon the spider, a lever for the shaft, and extending through the light compartment, a door closing an opening arranged below the lever, a turning member mounted upon the dark compartment, said member having egg receiving openings and being arranged directly above the egg tray, said member having an opening adapted to receive the shaft to connect the member therewith, and the said member being provided with a sight opening having an eye piece substantially as described.

In testimony whereof I affix my signature in presence of two witnesses.

JESSE R. GRANT.

Witnesses:
 F. F. REED,
 F. H. VOIGHT.